United States Patent [19]

Gremillion

[11] Patent Number: 5,104,223
[45] Date of Patent: Apr. 14, 1992

[54] OPTICAL INTERFEROMETRIC SENSOR DETECTED INTENSITY NOISE REDUCTION MEANS

[75] Inventor: Jeffrey C. Gremillion, Salem, Conn.

[73] Assignee: The United States of America as represented by the Secretary of the Navy, Washington, D.C.

[21] Appl. No.: 474,941

[22] Filed: Feb. 5, 1990

[51] Int. Cl.⁵ .............................................. G01B 9/02
[52] U.S. Cl. ............................... 356/345; 250/227.27
[58] Field of Search ..................... 250/227.19, 227.27, 250/237.6; 356/345

[56] References Cited

U.S. PATENT DOCUMENTS 3,830,568 8/1974 Allen .............................. 250/237.6
4,868,381 9/1989 Davis ............................ 250/227.27

FOREIGN PATENT DOCUMENTS 0177004 7/1988 Japan ................................. 356/358

Primary Examiner—Samuel A. Turner
Assistant Examiner—Richard E. Kurtz

[57] ABSTRACT

An apparatus for reducing the detected optical intensity noise received from an optical interferometric sensor. One embodiment of the device comprises high pass and low pass filtering means and an arithmetic divider device, arranged so as to receive a single signal $S_1$ and to cancel unwanted intensity noise in signal $S_1$ prior to the transmittal of the noise free signal $S_{out}$ to a receiver circuit. A second embodiment of the device further includes an adder and a subtractor to receive two signals $S_1$ and $S_2$. The adder and subtractor are cross connected in such a way as to combine the two signals for further processing and also to still permit intensity noise cancellation in the event one of the signals is not available.

2 Claims, 1 Drawing Sheet

OPTICAL INTERFEROMETRIC SENSOR DETECTED INTENSITY NOISE REDUCTION MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to intensity noise reduction and more particularly to a means for receiving laser intensity noise contaminated optical interferometric sensor detected signals and processing the received signals in such a way as to provide an output signal therefrom, substantially free of the intensity noise.

(2) Description of the Prior Art

It is well known that output signal of an interferometer is defined as:

$$S = \tfrac{1}{2} - (IV/2)\cos\phi = \tfrac{1}{2}(1 - IV\cos\phi) \quad (1)$$

where $I$ is the intensity of the laser light input to the interferometer, $V$ is a number from 0 to 1 representing the "visibility" of the interferometer which is a measure of interference depth or quality, and $\phi$ represents the optical phase difference between the two optical paths, $p_1$ and $p_2$, of the interferometer. A "perfect" interferometer is one which has a visibility of 1.

A prior art fiber-optic interferometer 10, as shown in FIG. 1, provides two outputs, $S_1$ and $S_2$. If perfect and identical detector-amplifier devices 12, each device further including a detector 12a and an amplifier 12b, are used, then $$S_1 = A(1 - IV\cos\phi) \text{ and,} \quad (2)$$

$$S_2 = A(1 - IV\cos\phi) \quad (3)$$

where $A$ is a gain factor which includes the factor $\tfrac{1}{2}$ in equation (1) above and also includes the scale factor of the detector-amplifier. If $V = 1$ and $A = 1$, then $$S_1 = 1 + I\cos\phi \text{ and} \quad (4)$$

$$S_2 = 1 - I\cos\phi. \quad (5)$$

The standard prior art method for achieving intensity noise rejection is to use a circuit which performs the operation resulting in the ratio $R$, where, $$R = (S_1 - S_2)/(S_1 + S_2) = (2I/2I)\cos\phi = \cos\phi \quad (6)$$

such that the signal output from the operation is no longer a function of laser intensity $I$. Therefore, any fluctuations in $I$, or intensity noise, are cancelled using this technique assuming that subtractor, summer, and divider operations are perfect.

The disadvantages of this prior art technique however are three-fold: first, if the arithmetic operations are not perfect, $I$ is not completely cancelled and intensity noise may not be sufficiently reduced; second, in order to detect the signals $S_1$ and $S_2$, two detectors are required which may not be desireable for some systems; and third, if one of the detectors or amplifiers should fail, e.g. $S_2 = 0$, then $$R = (S_1 - 0)/(S_1 - 0) = 1 \quad (7)$$

and total signal cancellation results.

SUMMARY OF THE INVENTION

Accordingly, it is a general purpose and object of the present invention to provide a means for reducing detected optical intensity noise associated with optical interferometric sensors.

It is a further object that such noise reduction be accomplished using simple circuitry.

Another object is that such device be useable with a wide variety of optical interferometric sensors.

Still another object is that such noise is rejected regardless of component function accuracy.

A still further object is that such device need not rely on employment of two detectors.

A still further object is that such device permit use of two detectors for fail-safe operation in the event one detector should fail.

These objects are accomplished with the present invention by providing an apparatus for reducing the detected optical intensity noise received from an optical interferometric sensor. One embodiment of the device comprises high pass and low pass filtering means and an arithmetic divider device, arranged so as to receive a single signal $S_1$ and to cancel unwanted intensity noise in signal $S_1$ prior to the transmittal of the noise free signal $S_{out}$ to a receiver circuit. A second embodiment of the device further includes an adder and a subtractor to receive two signals $S_1$ and $S_2$. The adder and subtractor are cross connected in such a way as to combine the two signals for further processing and also to still permit intensity noise cancellation in the event one of the signals is not available.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
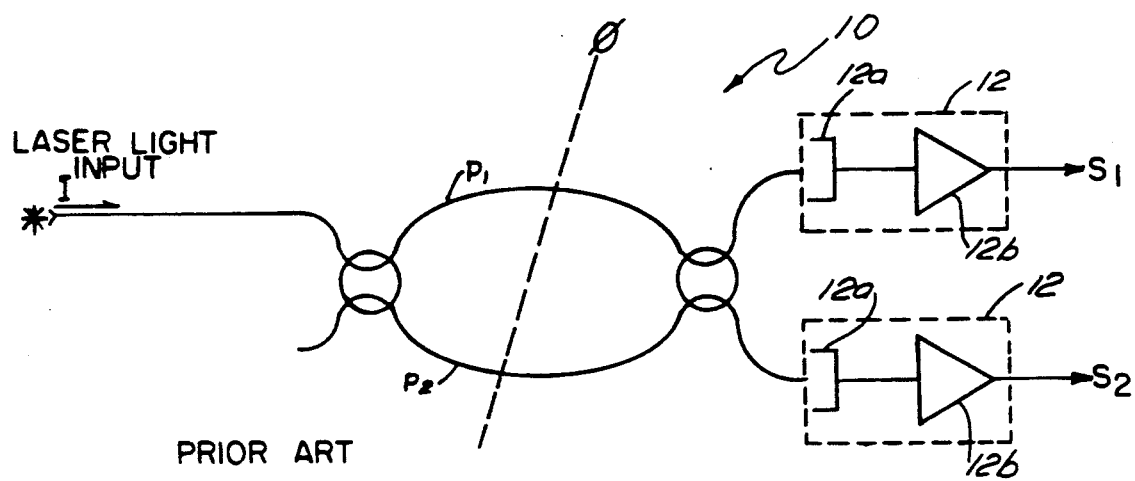
FIG. 1 shows a typical fiber optic interferometer.

For the general case of an interferometer which employs unmatched detector-amplifiers, the outputs from the detectoramplifiers are $$S_1 = A_1(1 + V\cos\phi), \text{ and} \quad (8)$$

$$S_2 = A_2(1 - V\cos\phi) \quad (9)$$

where $A_1$ and $A_2$ each include the intensity factor $I$. However, the two signals are still proportionate by a factor $R_O$, $$A_1 = R_O A_2. \quad (10)$$

and, since the two signals are derived from a single interferometer, the visibility V of each signal is the same.

The two signals are then imperfectly subtracted by a factor $R_1$, i.e., $$S_1 - (S_2/R_1) = A_1(1 - V\cos\phi) - A_1/R_0 R_1(1 - V\cos\phi) \quad (11)$$

or $$S_1 - (S_2/R_1) = A_1(1 - 1/R_0 R_1) + A_1 V(1 + 1/R_0 R_1)\cos\phi \quad (12)$$

The two signals are also imperfectly summed by a factor $R_2$, i.e., $$S_1 - (S_2/R_2) = A_1(1 - V\cos\phi) - A_1/R_0 R_2(1 - V\cos\phi) \quad (13)$$

or $$S_1 - (S_2/R_2) = A_1(1 - 1/R_0 R_2) + A_1 V(1 - 1/R_0 R_2)\cos\phi \quad (14)$$

Because $\cos\phi$ includes the signals of interest, which are high frequency components, then high-pass filtering equation (12) and low-pass filtering equation (14) results in, $$HPF(S_1 - S_2/R_1) = A_1 V(1 - 1/(R_0 R_1))\cos\phi \quad (15)$$

$$LPF(S_1 - S_2/R_2) = A_1(1 - 1/(R_0 R_2)) \quad (16)$$

The former is then imperfectly divided by the latter by a factor $R_3$ to obtain the final result $S_{out}$ output signal, $$S_{out} = [HPF(S_1 - S_2)]/[R_3 LPF(S_1 - S_2/R_2)]$$

$$= [V(1 - 1/(R_0 R_1))\cos\phi]/[R_3(1 - 1/(R_0 R_2))]. \quad (17)$$

$A_1$, which includes the intensity I, has been cancelled. The amplitude which does remain is a function of the ratios, $R_0$, $R_1$, assumed to vary little at low frequency for a "well behaved" interferometer. A subsequent AGC might then be used to reduce any of these remaining small low frequency fluctuations.

There are a few special cases of equation (17) worth noting. If the subtractor and summer are matched, i.e. $R_1 = R_2$, then $$S_{out} = (V/R_3)\cos\phi \quad (18)$$

and if then the divider is perfect, i.e $R_3 = 1$, $$S_{out} = V\cos\phi. \quad (19)$$

This is equivalent to the result of equation (6) for $V = 1$ as in equation (6).

The second special case of equation (17) is for the case where the device uses only one detector-amplifier, i.e. $R_0 = \infty$ (subtractor and summer not required), $$S_{out} = (V/R_3)\cos\phi. \quad (20)$$

Thus, not only are two detector-amplifiers not required, they may not be desireable for reasons of circuit complexity, parts count, and added noise. However, the use of two detector-amplifiers does provide for fail-safe operation in the event one detectoramplifier should fail. The circuit block diagram for the single detector-amplifier case described above is shown in FIG. 2 and the circuit block diagram for the two detector-amplifier case is shown in FIG. 3.

Figure 2:
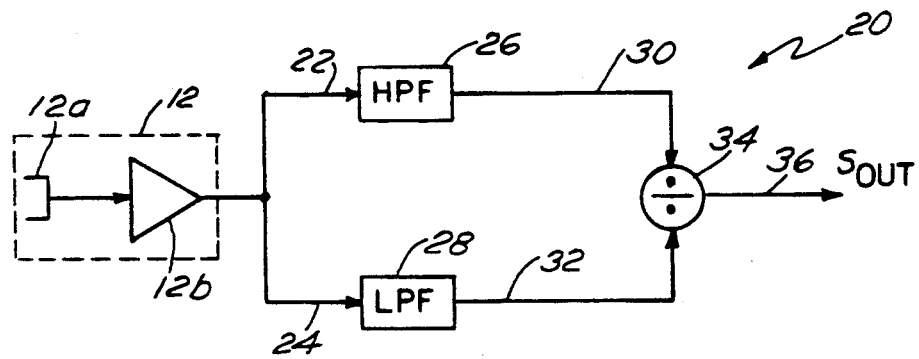
FIG. 2 shows a single detector-amplifier device according to the present invention.

Referring now to FIG. 2 there is shown a single detectoramplifier device 20 comprising a detector-amplifier 12 which outputs a signal, $S_1$ or $S_2$, that is then divided into identical signals 22 and 24. Signals 22 and 24 are transmitted to a highpass filter 26 and a low pass filter 28 respectively. The filtered signal outputs 30 and 32, of filters 26 and 28 respectively, are provided as input to a divider 34 which produces signal 36, $S_{out}$, therefrom. Signal $S_{out}$ is free of intensity noise, containing only the signal of interest.

Figure 3:
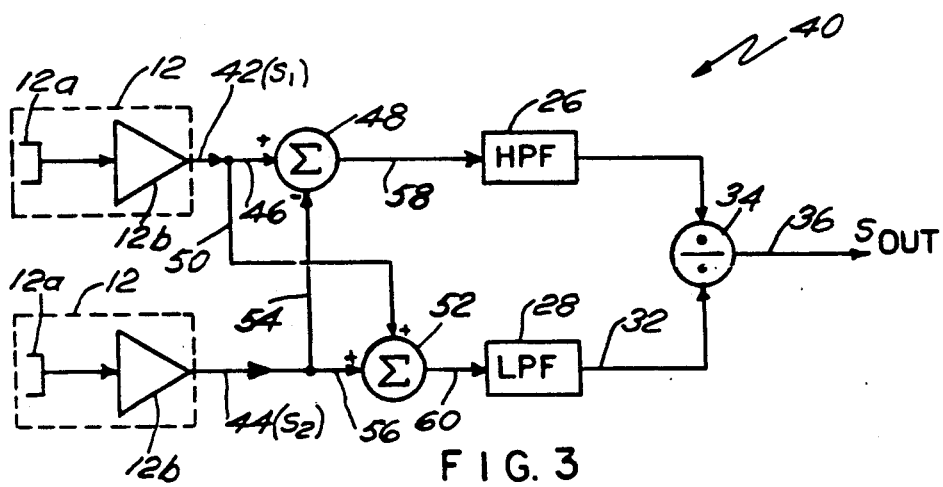
FIG. 3 shows a two detector-amplifier device according to the present invention.

FIG. 3 shows a two detector-amplifier device 40 comprising first and second detector-amplifiers 12 which output signals 42 and 44, $S_1$ and $S_2$, respectively. Signal 42 is split into signal 46 which is transmitted to subtractor 48 and signal 50 which is transmitted to adder 52. Signal 44 is split into signal 54 which is transmitted to subtractor 48 and signal 56 which is transmitted to adder 52. Subtractor 48 produces a signal 58 representing the difference between signal 46 and signal 54. Adder 52 produces a signal 60 representing the sum of signal 50 and signal 56. Signals 58 and 60 are then transmitted to high-pass filter 26 and low pass filter 28 respectively. The filtered output signals 30 and 32 are inputted to a divider 34 which produces intensity noise free signal 36, $S_{out}$, therefrom.

The advantages of the present invention over the prior art are that this invention does not require the perfect conditions of the prior methods, and needs only a single detector-amplifier yet may employ two detector-amplifiers for increased reliability and fail-safe operation if desired.

What has thus been described is an apparatus for reducing the detected optical intensity noise received from an optical interferometric sensor. One embodiment of the device comprises high pass and low pass filtering means and an arithmetic divider device, arranged so as to receive a single signal $S_1$ and to cancel unwanted intensity noise in signal $S_1$ prior to the transmittal of the noise free signal $S_{out}$ to a receiver circuit. A second embodiment of the device further includes an adder and a subtractor to receive two signals $S_1$ and $S_2$. The adder and subtractor are cross connected in such a way as to combine the two signals for further processing and also to still permit intensity noise cancellation in the event one of the signals is not available.

Obviously many modifications and variations of the present invention may become apparent in light of the above teachings. For example: The invention also has theoretical applicability to microwave and RF fields of technology. In addition, while the detector-amplifier means is shown to have discrete components 12a and 12b, it may of course be fabricated as a single component as shown by block 12.

In light of the above, it is therefore understood that within the scope of the appended claims, the invention may be practiced otherwise than as specifically described.

What is claimed is:

1. In combination with an optical interferometric sensing means that produces an intensity noise contaminated output light signal, an intensity noise reduction apparatus, comprising:
   at lest one detector-amplifier means, adapted to receive said intensity noise contaminated output light signal from said optical interferometric sensing means, for producing a proportional intensity noise contaminated electrical signal therefrom, each said detectoramplifier means further comprising an optical detector, for receiving said intensity noise contaminated light signal from said interferometric means and converting said light signal into a proportional electrical signal, and an amplifier, electrically connected to said optical detector, for receiving and amplifying said proportional electrical signal; and signal processing means, electrically connected to said at least one detector-amplifier means, for receiving said intensity noise contaminated electrical output signal from said detector amplifier means and processing said electrical signal in such a way as to produce an output electrical signal substantially free of said intensity noise, said signal processing means further comprising, a high pass filter, electrically connected to said amplifier, for receiving and filtering said proportional electrical signal so as to produce as output only high frequency components thereof, a low pass filter, electrically connected to said amplifier, for receiving and filtering said proportional electrical signal so as to produce as output only the low frequency components thereof, and a divider, electrically connected to said high pass and said low pass filters, for receiving the outputs thereof and dividing said high frequency components by said low frequency components thereby canceling said intensity noise leaving only said output electrical signal.

2. An apparatus according to claim 1 wherein said signal processing means further comprises:

an adder, electrically connected to each of said at least one detector-amplifier means, for receiving the outputs thereof and summing said outputs to produce a combined electrical sum signal therefrom;

a subtracter, electrically connected to each of said at least one detector-amplifier means, for receiving the outputs thereof and subtracting said outputs to produce a combined electrical difference signal therefrom;

a high pass filter, electrically connected to said subtractor, for receiving and filtering said combined electrical difference signal so as to produce as output only high frequency components thereof;

a low pass filter, electrically connected to said adder, for receiving and filtering said combined electrical sum signal so as to produce as output only low frequency components thereof; and a divider, electrically connected to said high pass and said low pass filters, for dividing said high frequency components by said low frequency components thereby canceling said intensity noise leaving only said output electrical signal.

* * * * *